(12) United States Patent
Takuman et al.

(10) Patent No.: US 6,284,861 B1
(45) Date of Patent: Sep. 4, 2001

(54) SILICONE RUBBER COMPOSITION

(75) Inventors: Osamu Takuman; Makoto Yoshitake; Akito Nakamura, all of Chiba Prefecture (JP)

(73) Assignee: Dow Corning Toray Silicone, Ltd., Tokyo (JP)

( * ) Notice: Subject to any disclaimer, the term of this patent is extended or adjusted under 35 U.S.C. 154(b) by 0 days.

(21) Appl. No.: 09/458,741

(22) Filed: Dec. 13, 1999

(51) Int. Cl.$^7$ .................................................. C08G 77/20
(52) U.S. Cl. .................. 528/31; 528/32; 528/15; 556/408
(58) Field of Search .................. 528/15, 31, 32, 528/38; 556/408; 524/262, 265

(56) References Cited

U.S. PATENT DOCUMENTS

| | | |
|---|---|---|
| 4,609,574 | * 9/1986 | Keryk et al. . |
| 5,145,932 | * 9/1992 | Sasaki et al. . |
| 5,232,959 | * 8/1993 | Togashi et al. . |
| 5,366,805 | 11/1994 | Fujiki et al. .......................... 428/412 |
| 5,418,065 | 5/1995 | Fujiki et al. .......................... 428/451 |
| 5,468,815 | * 11/1995 | Boardman et al. . |
| 5,945,555 | * 8/1999 | Yoshitake . |

FOREIGN PATENT DOCUMENTS

| | | | |
|---|---|---|---|
| 0 908 462 | 4/1999 | (EP) | C07F/7/18 |
| 0 919 558 | 6/1999 | (EP) | C07F/7/18 |
| 10-182669 | 10/1998 | (JP) | C07F/7/18 |

\* cited by examiner

*Primary Examiner*—Robert Dawson
*Assistant Examiner*—Marc S. Zimmer

(74) *Attorney, Agent, or Firm*—William F. Boley; Jennifer S. Warren; Rick D. Streu

(57) ABSTRACT

A silicone rubber composition comprising (A) 100 weight parts of a polydiorganosiloxane mixture comprising (i) 1 to 99 wt % polydiorganosiloxane having at least two silicon atom-bonded vinyl groups per molecule and (ii) the remaining percentage of polydiorganosiloxane having at least two non-vinyl silicon atom-bonded alkenyl groups per molecule, (B) a polyorganosiloxane having at least two silicon atom-bonded hydrogen atoms per molecule, (C) 0.1 to 10 weight parts of a silatrane derivative described by general formula

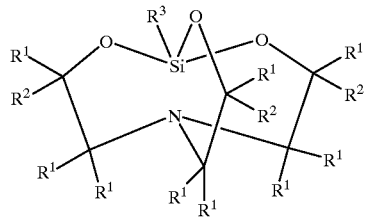

where each $R^1$ group is independently selected from the group consisting of a hydrogen atom and alkyl groups; each $R^2$ group is independently selected from the group consisting of a hydrogen atom, alkyl groups, and alkenyloxyalkyl groups described by the general formula $$—R^4—O—R^5$$

where $R^4$ is an alkylene group, and $R^5$ is an alkenyl group; at least one $R^2$ group is an alkenyloxyalkyl group; and $R^3$ is a group selected from the group consisting of substituted and unsubstituted monovalent hydrocarbon groups, $C_1$ to $C_{10}$ alkoxy groups, glycidoxyalkyl groups, oxiranylalkyl groups, acyloxyalkyl groups, and aminoalkyl groups; and (D) a platinum type catalyst in an amount sufficient to cure the composition.

7 Claims, No Drawings

SILICONE RUBBER COMPOSITION

BACKGROUND OF INVENTION

The present invention relates to a silicone rubber composition, and more particularly relates to a silicone rubber composition with excellent adhesion to organic resins even after being cured at a relatively low temperature, and even more particularly relates to a silicone rubber composition that is favorable for use in composite molding, whose adhesion to organic resins and mold release properties are excellent in composite molding, such as insert molding or multi-color molding, of an organic resin and a silicone rubber composition.

A method that has been adopted for bonding a silicone rubber to an organic resin in composite molding such as insert molding or multi-color molding involves priming a pre-molded organic resin and then curing it while it is brought together with a silicone rubber composition. A problem with this method, however, is that a priming step is required, and the adhesion of the silicone rubber decreases if this priming treatment is inadequate. Another problem is that the silicone rubber composition has to be cured at a relatively high temperature in order for this composition to adhere sufficiently to an organic resin, so organic resins with low heat resistance can not be used.

In addition, to bond a silicone rubber securely to an organic resin, there are known methods involving the use of an organic resin containing aliphatic unsaturated groups (Japanese Laid-Open Patent Applications 6-171021, 6-171022, and 6-171023), and methods featuring the use of a silicone rubber composition to which vinyltrimethoxysilane, 3-glycidoxypropyltrimethoxysilane, 3-methacryloxypropyl-trimethoxysilane, or another such adhesion improver has been added. A limitation to the former method, however, was that a special organic resin had to be used, while a problem with the latter method was that the mold release properties decreased, and in extreme cases, the silicone rubber even adhered to the mold.

The inventors arrived at the present invention as a result of diligent study aimed at solving the above problems. Specifically, it is an object of the present invention to provide a silicone rubber composition with excellent adhesion to organic resins even after being cured at a relatively low temperature, and in turn a silicone rubber composition that is favorable for use in composite molding, whose adhesion to organic resins and mold release properties are excellent in composite molding, such as insert molding or multi-color molding, of an organic resin and a silicone rubber composition.

SUMMARY OF INVENTION

A silicone rubber composition comprising (A) 100 weight parts of a polydiorganosiloxane mixture comprising (i) I to 99 wt % polydiorganosiloxane having at least two silicon atom-bonded vinyl groups per molecule and (ii) the remaining percentage of polydiorganosiloxane having at least two non-vinyl silicon atom-bonded alkenyl groups per molecule, (B) a polyorganosiloxane having at least two silicon atom-bonded hydrogen atoms per molecule, (C) 0.1 to 10 weight parts of a silatrane derivative described by general formula

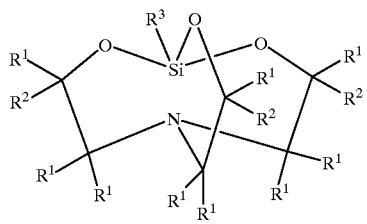

where each $R^1$ group is independently selected from the group consisting of a hydrogen atom and alkyl groups; each $R^2$ group is independently selected from the group consisting of a hydrogen atom, alkyl groups, and alkenyloxyalkyl groups described by the general formula $$-R^4O-R^5$$

where $R^4$ is an alkylene group, and $R^5$ is an alkenyl group; at least one $R^2$ group is an alkenyloxyalkyl group; and $R^3$ is a group selected from the group consisting of substituted and unsubstituted monovalent hydrocarbon groups, $C_1$ to $C_{10}$ alkoxy groups, glycidoxyalkyl groups, oxiranylalkyl groups, acyloxyalkyl groups, and aminoalkyl groups; and (D) a platinum type catalyst in an amount sufficient to cure the composition.

DESCRIPTION OF INVENTION

The silicone rubber composition for composite molding of the present invention comprises:

(A) 100 weight parts of a polydiorganosiloxane mixture comprising (i) 1 to 99 wt % polydiorganosiloxane having at least two silicon atom-bonded vinyl groups per molecule and (ii) the remaining percentage of polydiorganosiloxane having at least two non-vinyl silicon atom-bonded alkenyl groups per molecule;

(B) a polyorganosiloxane having at least two silicon atom-bonded hydrogen atoms per molecule in an amount such that the ratio of the number of moles of hydrogen atoms bonded to silicon atoms in this component to the number of moles of alkenyl groups bonded to silicon atoms in component (A) is between 0.5:1 and 20: 1;

(C) 0.1to 10 weight parts of a silatrane derivative described by general formula:

(Chemical Formula 2)

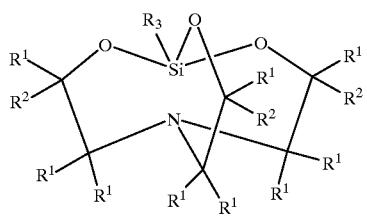

where each $R^1$ group is independently selected from the group consisting of a hydrogen atom and alkyl groups; each $R^2$ group is independently selected from the group consisting of a hydrogen atom, alkyl groups, and alkenyloxyalkyl groups described by the general formula $-R^4-O-R^5$, where $R^4$ is an alkylene group, and $R^5$ is an alkenyl group; at least one $R^2$ group is an alkenyloxyalkyl group; and $R^3$ is selected from the group consisting of substituted and unsubstituted monovalent hydrocarbon groups, $C_1$ to $C_{10}$ alkoxy groups, glycidoxyalkyl groups, oxiranylalkyl groups, acyloxyalkyl groups, and aminoalkyl groups; and (D) a platinum type catalyst in an amount sufficient to cure the composition.

The silicone rubber composition of the present invention will now be described in detail. Component A is the principal component of the present composition, and is a polydiorganosiloxane mixture comprising (i) a polydiorganosiloxane having at least two silicon atom-bonded vinyl groups per molecule and (ii) a polydiorganosiloxane having at least two non-vinyl silicon atom-bonded alkenyl groups per molecule. This component A is composed of 1 to 99 wt % component (i) and the remaining weight percentage is component (ii), and is preferably composed of 10 to 99 wt % component (i) and the remaining weight percentage of component (ii), and it is particularly favorable for component (i) to account for 50 to 99 wt %, and component (ii) the remaining weight percentage. This is because the adhesion of the silicone rubber to organic resins when cured at a relatively low temperature will tend to decrease if the content of component (i) is below the lower limit of this range, whereas the mechanical properties of the silicone rubber will tend to suffer if the upper limit of this range is exceeded.

Component (i) is a polydiorganosiloxane having at least two silicon atom-bonded vinyl groups per molecule. The molecular structure of component (i) is substantially linear, but part of the molecular chain may be somewhat branched. The bonding position of the vinyl groups in component (i) is not restricted, and may be at the molecular chain terminals, pendant, or both, but the molecular chain terminals is preferred because the mechanical properties of the obtained silicone rubber will be superior. Examples of groups that can be bonded to the silicon atoms besides vinyl groups in component (i) include alkyl groups such as methyl, ethyl, propyl, butyl, and octyl; aryl groups such as phenyl and tolyl; halogenated alkyl groups such as chloromethyl and 3,3,3-trifluoropropyl; and other substituted and unsubstituted monovalent hydrocarbon groups having no aliphatic unsaturated carbon-carbon bonds. There are no restrictions on the viscosity of component (i), but a range of 10 to 1,000,000 mPa·s at 25° C. is preferable.

Examples of the polydiorganosiloxane of component (i) include a dimethylvinylsiloxy group-capped polydimethylsiloxane capped at both ends of the molecular chain, a trimethylsiloxy group-capped dimethylsiloxane.methylvinylsiloxane copolymer capped at both ends of the molecular chain, a dimethylvinylsiloxy group-capped dimethylsiloxane.methylvinylsiloxane copolymer capped at both ends of the molecular chain, a dimethylvinylsiloxy group-capped dimethylsiloxane.methylphenylsiloxane copolymer capped at both ends of the molecular chain, and a dimethylvinylsiloxy group-capped dimethylsiloxane.methyl (3,3,3,-trifluoropropyl)-siloxane copolymer capped at both ends of the molecular chain.

Component (ii) is used to improve the adhesion to organic resins of a silicone rubber composition in which this component is used, as compared to that of a silicone rubber composition in which component (i) alone is the principal component, and is a polydiorganosiloxane having at least two non-vinyl silicon atom-bonded alkenyl groups per molecule. The molecular structure of component (ii) is substantially linear, but part of the molecular chain may be somewhat branched. The alkenyl group in component (ii) can be any alkenyl group except a vinyl group, specific examples of which include the allyl group, butenyl group, and hexenyl group. The bonding position of the alkenyl groups in component (ii) is not restricted, and may be at the molecular chain terminals, pendant, or both, but the molecular chain terminals is preferred because the mechanical properties of the obtained silicone rubber will be superior. Examples of groups that can be bonded to the silicon atoms besides alkenyl groups in component (ii) include alkyl groups such as methyl, ethyl, propyl, butyl, and octyl; aryl groups such as phenyl and tolyl; halogenated alkyl groups such as chloromethyl and 3,3,3-trifluoropropyl; and other substituted and unsubstituted monovalent hydrocarbon groups having no aliphatic unsaturated carbon-carbon bonds. There are no restrictions on the viscosity of component (ii), but a range of 10 to 1,000,000 mPa·s at 25° C. is preferable.

Examples of the polydiorganosiloxane of component (ii) include a dimethylhexenylsiloxy group-capped polydimethylsiloxane capped at both ends of the molecular chain, a trimethylsiloxy group-capped dimethylsiloxane.dimethylhexenylsiloxane copolymer capped at both ends of the molecular chain, a dimethylhexenylsiloxy group-capped dimethylsiloxane.methylhexenylsiloxane copolymer capped at both ends of the molecular chain, a dimethylhexenyloxy group-capped dimethylsiloxane.methylphenylsiloxane copolymer capped at both ends of the molecular chain, and a dimethylhexenylsiloxy group-capped dimethylsiloxane.methyl(3,3,3,-trifluoropropyl)siloxane copolymer capped at both ends of the molecular chain.

Component B acts as a crosslinking agent in the present composition, and is a polyorganosiloxane having at least two silicon atom-bonded hydrogen atoms per molecule. There are no restrictions on the molecular structure of component B, but examples include linear, linear with some branches, branched, cyclic, and resinous. Examples of groups that can be bonded to the silicon atoms besides the silicon atom-bonded hydrogen atoms in component B include alkyl groups such as methyl, ethyl, and propyl; aryls groups such as phenyl and tolyl; halogenated alkyl groups such as chloromethyl, 3-chloropropyl, and 3,3,3-trifluoropropyl; and other substituted and unsubstituted monovalent hydrocarbon groups. There are no restrictions on the viscosity of component B, but a range of 1 to 10,000 mPa·s at 25° C. is preferable. When component A is a polydiorganosiloxane having two alkenyl groups per molecule, it is preferable for component B to include at least a polyorganosiloxane having three or more silicon atom-bonded hydrogen atoms per molecule, but when component A includes at least a polydiorganosiloxane having three or more silicon atom-bonded alkenyl groups per molecule, component B may be composed of just a polyorganosiloxane having two silicon atom-bonded hydrogen atoms per molecule.

Examples of the polyorganosiloxane of component B include a dimethylhydridosiloxy group-capped polydimethyl siloxane capped at both ends of the molecular chain, a trimethylsiloxy group-capped polymethylhydridosiloxane capped at both ends of the molecular chain, a trimethylsiloxy group-capped dimethylsiloxane.methylhydridosiloxane copolymer capped at both ends of the molecular chain, a dimethylhydridosiloxy group-capped dimethylsiloxane.methylhydridosiloxane copolymer capped at both ends of the molecular chain, a cyclic dimethylsiloxane.methylhydridosiloxane copolymer, a cyclic polymethylhydridosiloxane, an organosiloxane copolymer composed of siloxane units described by formula $R_3SiO_{1/2}$, siloxane units described by formula $R_2HSiO_{1/2}$, and siloxane units described by formula $SiO_{4/2}$, an organosiloxane copolymer composed of siloxane units described by formula $R_2HSiO_{1/2}$ and siloxane units described by formula $SiO_{4/2}$, an organosiloxane copolymer composed of siloxane units described by formula $RHSiO_{2/2}$ and siloxane units described by formula $RSiO_{3/2}$ or siloxane units described by formula $HSiO_{3/2}$, and mixtures of two or more types of these polyorganosiloxanes. R in the above formulas is a substituted or unsubstituted monovalent hydrocarbon group with no aliphatic unsaturated carbon-carbon bonds, examples of which are the same groups as those listed above.

The amount in which component B is contained in this composition is such that the ratio of the number of moles of hydrogen atoms bonded to silicon atoms in this component to the number of moles of alkenyl groups bonded to silicon atoms in component A is between 0.5:1 and 20:1. This is because the resulting composition will tend not to cure sufficiently if the component B content is below the range given above, and because the mechanical strength of the resulting silicone rubber will tend to decrease if the above range is exceeded.

Component C serves to enhance the adhesion of the present composition to organic resins, and, through the joint use of component (ii), serves to enhance the adhesion to organic resins even when the composition is cured at a relatively low temperature. Component C comprises a silatrane derivative described by general formula:

(Chemical Formula 3)

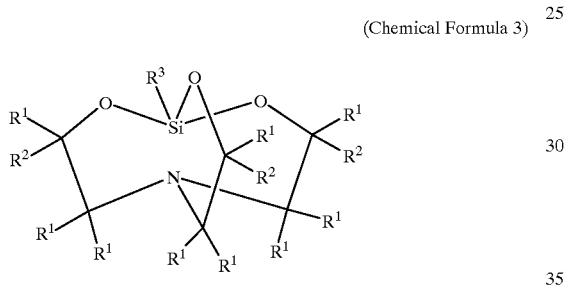

In formula 3, each $R^1$ group is independently selected from the group consisting of a hydrogen atom and alkyl groups. Examples of the alkyl group of $R^1$ include methyl, ethyl, propyl, butyl, pentyl, isopropyl, isobutyl, cyclopentyl, and cyclohexyl. It is particularly preferred for $R^1$ to be a hydrogen atom or a methyl group. Each $R^2$ group in formula 3 is independently selected from the group consisting of a hydrogen atom, alkyl groups, and alkenyloxyalkyl groups described by general formula —$R^4$—O—$R^5$. At least one $R^2$ group is an alkenyloxyalkyl group. Examples of the alkyl group of $R^2$ are the same as those given for $R^1$ above. With the alkenyloxyalkyl group of $R^2$, $R^4$ in the formula is an alkylene group, examples of which include the methylene, ethylene, methylmethylene, and propylene, with the methylene group being preferred. $R^5$ in the above formula is an alkenyl group, examples of which include vinyl, allyl, butenyl, pentenyl, and hexenyl, with a $C_3$ to $C_{10}$ alkenyl group being preferred, and the allyl group being most preferred. $R^3$ in the above formula is at least one type of group selected from the group consisting of substituted and unsubstituted monovalent hydrocarbon groups, $C_1$ to $C_{10}$ alkoxy groups, glycidoxyalkyl groups, oxiranylalkyl groups, acyloxyalkyl groups, and aminoalkyl groups. Examples of the monovalent hydrocarbon group of $R^3$ include alkyl groups such as methyl, ethyl, propyl, butyl, pentyl, isopropyl, cyclopentyl, and cyclohexyl; alkenyl groups such as vinyl, allyl, butenyl, pentenyl, and hexenyl; aryl groups such as tolyl and xylyl; aralkyl groups such as benzyl and phenethyl; and halogenated alkyl groups such as chloromethyl, 3-chloropropyl, and 3,3,3-trifluoropropyl. Examples of the alkoxy group of $R^3$ include methoxy, ethoxy, and propoxy; examples of the glycidoxyalkyl group of $R^3$ include 3-glycidoxypropyl; examples of the oxiranylalkyl group of $R^3$ include 4-oxiranylbutyl and 8-oxiranylbutyl; examples of the acyloxyalkyl group of $R^3$ include acetoxypropyl and 3-methacryloxypropyl; and examples of the amionalkyl group of $R^3$ include 3-aminopropyl and N-(2-aminoethyl)-3-amionpropyl.

The following compounds are examples of the silatrane derivative of component C.

(Chemical Formula 4)

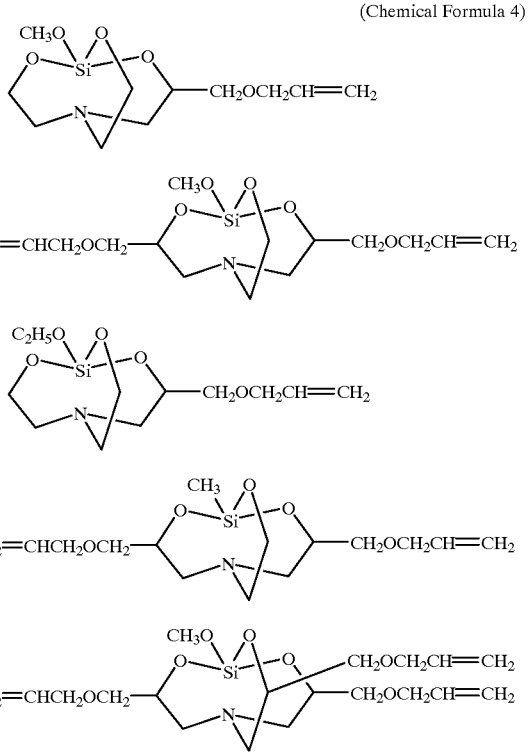

(Chemical Formula 5)

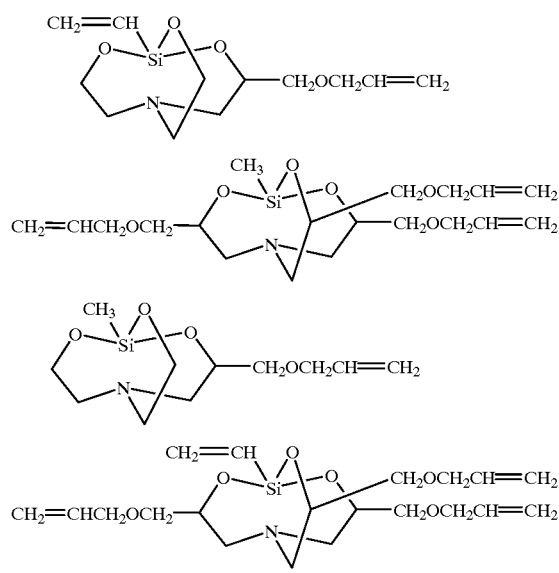

-continued

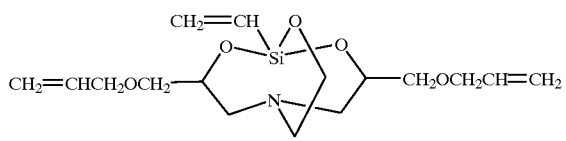

(Chemical Formula 6)

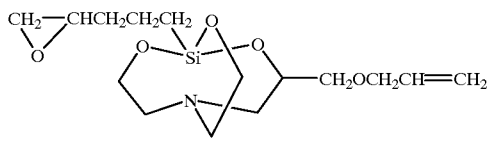

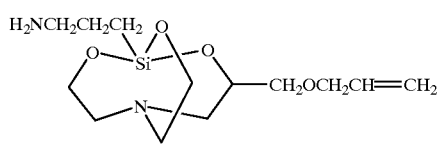

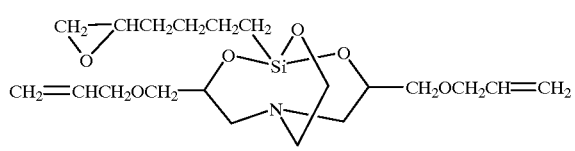

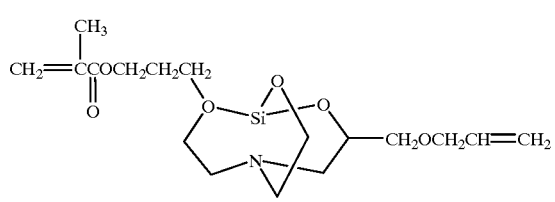

(Chemical Formula 7)

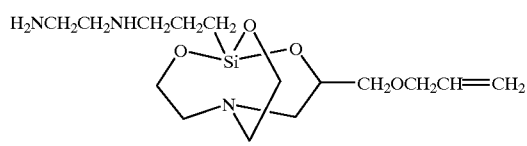

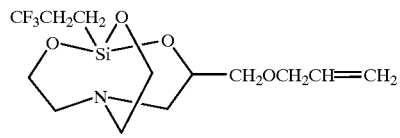

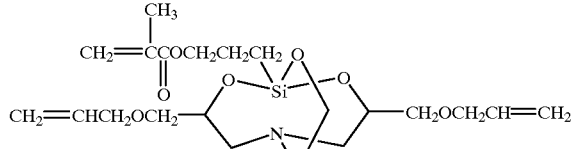

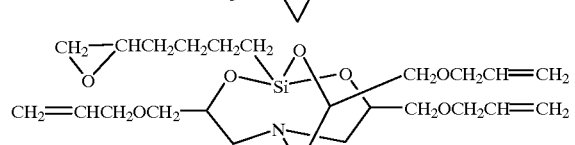

An example of the method for manufacturing the silatrane derivative of component C is given below.

An epoxy compound described by the general formula:

(Chemical Formula 8)

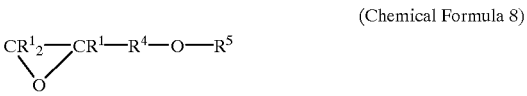

where the $R^1$ groups are the same or different, and are each a hydrogen atom or an alkyl group, $R^4$ is an alkylene group, and $R^5$ is an alkenyl group and an alkoxysilane compound described by the general formula $$R^6Si(OR^7)_3$$

where $R^6$ is at least one type of group selected from the group consisting of substituted and unsubstituted monovalent hydrocarbon groups, $C_1$ to $C_{10}$ alkoxy groups, acyloxyalkyl groups, and aminoalkyl groups, and $R^7$ is a $C_1$ to $C_{10}$ alkyl group, are allowed to react with ammonia or an amine compound described by the general formula:

$$NH_y(CR^1{}_2CR^1{}_2OH)_{(3-y)}$$

where the $R^1$ groups are the same or different, and are each a hydrogen atom or an alkyl group, and y is 1 or 2.

The epoxy compound is a raw material for forming the skeleton of the silatrane derivative of component C, and is also a raw material for introducing alkenyloxyalkyl groups into the molecules of the silatrane derivative. The $R^1$ groups in the above formula are the same or different, and are each a hydrogen atom or an alkyl group, with examples being the same as the groups listed above. $R^4$ in the above formula is an alkylene group, with examples being the same as the groups listed above. $R^5$ in the above formula is an alkenyl group, with examples being the same as the groups listed above, although a $C_3$ to $C_{10}$ alkenyl group is preferred, with an allyl group being most preferred. Examples of epoxy compounds such as this include allyl glycidyl ether and butenyl glycidyl ether.

The alkoxysilane compound is a raw material for forming the skeleton of the silatrane derivative of component C. $R^6$ in the above formula is at least one type of group selected from the group consisting of substituted and unsubstituted monovalent hydrocarbon groups, $C_1$ to $C_{10}$ alkoxy groups, acyloxyalkyl groups, and aminoalkyl groups. Examples of the monovalent hydrocarbon group of $R^6$ are the same as the monovalent hydrocarbon groups listed above for $R^3$, examples of the alkoxy group of $R^6$ are the same as the alkoxy groups listed above for $R^3$, examples of the acyloxyalkyl group of $R^6$ are the same as the acyloxyalkyl groups listed above for $R^3$, and examples of the aminoalkyl group of $R^6$ are the same as the aminoalkyl groups listed above for $R^3$. $R^7$ in the above formula is a $C_1$ to $C_{10}$ alkyl group, examples of which include methyl, ethyl, propyl, and butyl. Examples of an alkoxysilane compound such as this include tetramethoxysilane, tetraethoxysilane, methyltrimethoxysilane, methyltriethoxysilane, vinyltrimethoxysilane, vinyltriethoxysilane, phenyltrimethoxysilane, 3-methacryloxypropyltrimethoxysilane, 3,3,3-trifluoropropyltrimethoxysilane, nonafluorobutylethyltrimethoxysilane, 3-aminopropyltrimethoxysilane, 3-aminopropyltriethoxysilane, and N-(2-aminoethyl)-3-aminopropyltrimethoxysilane.

The ammonia or amine compound is a raw material for forming the skeleton of the silatrane derivative of component C. In the amine compound, the $R^1$ groups in the above formula are the same or different, and are each a hydrogen atom or an alkyl group, examples of which are the same as the groups listed above. y in the formula is 1 or 2. Examples of this amine compound include 2-hydroxyethylamine, 2,2'-dihydroxyethylamine, and 2-hydroxy-2-methyl-ethylamine.

There are no restrictions on the amounts in which the epoxy compound and alkoxy compound are added with respect to the ammonia in the above-mentioned manufacturing method, but in order to suppress by-products and obtain the silatrane derivative at a good yield, when the reaction is conducted under conditions such that the ammonia will not be lost during the reaction, it is preferable for this epoxy compound to be used in an amount of 2 to 20 mol per mole of ammonia, with a range of 3 to 15 mol being even better. It is also preferable for the amount in which the alkoxy compound is added to be from 0.5 to 50 mol per mole of ammonia, with a range of 1 to 20 mol being even better. This means that it is recommended that this alkoxy compound be used in about the stoichiometric amount or an excess amount with respect to the ammonia in this manufacturing method. In general, by-products will be suppressed, but an excess of alkoxy compound will remain behind if the alkoxy compound is used in an excess amount, but not so large an amount that the reaction will be slowed. This unreacted and remaining alkoxy compound can be separated and recovered from the silatrane derivative by distillation or the like as needed after the reaction. This reaction can also be conducted while ammonia gas is blown into the mixture of the epoxy compound and the alkoxy compound. When this reaction is conducted in an open system, part of the ammonia will not react and will be released outside the system, so it must be used in an excess amount large enough to compensate for this loss.

There are no restrictions on the amount in which the epoxy compound and alkoxy compound are added with respect to the amine compound in this manufacturing method, but in order to obtain the silatrane derivative at a good yield, when y in this amine compound is 1, this epoxy compound should be used in an amount of 0.5 to 10 mol per mole of this amine compound, with a range of 0.8 to 5 mol being even better. When y is 2 in this amine compound, this epoxy compound should be used in an amount of 1.5 to 20 mol, with a range of 1.8 to 10 mol being even better, and an amount of about 2 mol being particularly favorable. It is also preferable for the amount in which this alkoxysilane compound is added to be from 0.5 to 50 mol per mole of the amine compound, with a range of 1 to 20 mol being even better. This means that it is recommended that this alkoxysilane compound be used in about the stoichiometric amount or an excess amount with respect to the amine compound in this manufacturing method. In general, by-products will be suppressed, but an excess of alkoxysilane compound will remain behind if the alkoxysilane compound is used in an excess amount, but not so large an amount that the reaction will be slowed. This unreacted and remaining alkoxysilane compound can be separated and recovered from the silatrane derivative by distillation or the like as needed after the reaction.

In the above-mentioned manufacturing method, the reaction will proceed at normal temperature or under heating, but heating to 100° C. or lower is preferred in order to shorten the reaction time. The use of an organic solvent is optional in the manufacturing method of the present invention, and examples of organic solvents that can be used include hexane, heptane, octane, and other aliphatic hydrocarbons; toluene, xylene, and other aromatic hydrocarbons; methanol, ethanol, isopropanol, and other alcohols; acetone, methyl isobutyl ketone, and other ketones; diethyl ether, tetrahydrofuran, and other ethers; ethyl acetate, isoamyl acetate, and other esters; and dimethylformamide, dimethylacetamide, and other amide compounds. In particular, the use of an alcohol such as methanol or ethanol allows the reaction time to be shortened and the targeted silatrane derivative to be obtained at a better yield. In the manufacturing method of the present invention, when an alcohol is added, it should preferable have the same number of carbon atoms as the silicon atom-bonded alkoxy groups in the raw material alkoxy compound in order to subject the silicon atom-bonded alkoxy groups to an alkoxy group exchange reaction. Also, when an alcohol is added in the above-mentioned manufacturing method, the reaction can be markedly shortened and the yield of the obtained silatrane derivative can be enhanced by conducting the reaction at the reflux temperature of this alcohol.

The platinum type catalyst of component D is a catalyst for curing the present composition through a hydrosilylation reaction. Examples of this platinum type catalyst of component D include platinum microparticles, chloroplatinic acid, an alcohol-modified chloroplatinic acid, a diketone complex of platinum, an olefin complex of platinum, platinum supported on a powder such as alumina, silica, or carbon black, and thermoplastic resin microparticles containing these platinum type catalysts in an amount of at least 0.01 wt % as platinum metal atoms. The thermoplastic resin can have a softening point of 50 to 150° C., and the average diameter of the microparticles thereof can be 0.01 to 10 µm. Examples of this thermoplastic resin include thermoplastic silicone resins, thermoplastic acrylic resins, thermoplastic polysilane resins, thermoplastic polystyrene resins, and thermoplastic methyl cellulose resins. A feature is that when thermoplastic resin microparticles containing at least 0.01 wt % platinum metal atoms, having a softening point of 50 to 150° C., and having an average diameter of 0.01 to 10 µm are used as the platinum type catalyst of component D, the storage stability of the obtained silicone rubber composition will be better and there will be very little change in viscosity even when this composition is left at room temperature for an extended period.

The amount in which component D is contained in the present composition is an amount large enough to promote cure of the composition, and in more specific terms there should be 0.1 to 1000 weight parts of platinum metal atoms per million weight parts of component A, with a range of 0.1 to 500 weight parts being preferable, and a range of 1 to 100 weight parts being even better. This is because the curing of the obtained silicone rubber composition will tend to be markedly slower if the component D content is below the above range, but on the other hand, there will be no pronounced increase in curing rate if the above range is exceeded, and there is the danger of encountering problems such as the discoloration of the silicone rubber obtained by curing.

The present composition is composed of the above-mentioned components A to D, but other components can also be added as needed, such as fumed silica, wet silica, and other such reinforcing fillers; iron oxide, rare earth compounds, and other such heat stabilizers; manganese carbonate, titanium dioxide, and other such flame retardants; quartz powder, diatomaceous earth, calcium carbonate, carbon black, and other such extending fillers; and pigments.

In order to enhance the storage stability of the present composition and make it easier to handle and work with, it can also contain an acetylene compound such as 2-methyl-3-butyn-2-ol, 2-phenyl-3-butyn-2-ol, 3-methyl-1-hexyn-3-ol, 1,5-hexadiene, or 1,6-heptadiene; an ene-ine compound such as 1-ethynyl-1-cyclohexanol, an alkenylsiloxane oligomer such as 1,3-divinyltetramethyldisiloxane, 1,3,5,7-tetravinyltetramethylcyclotetrasiloxane, or 1,3-divinyl-1,3-diphenyldimethyldisiloxane; a nitrogen-containing compound such as tributylamine, tetramethylethylenediamine, or benzotriazole; a phosphorus-containing compound such as triphenylphosphine; or a sulfur-containing compound, a hydroperoxy compound, a maleic acid derivative, or another such curing inhibitor. The amounts in which these curing inhibitors are contained should be from 0.005 to 10 weight parts per million weight parts of component A and component B combined.

The present composition is prepared by uniformly mixing the above-mentioned components A to D, but in order to enhance the storage stability of this composition near room temperature and to maintain excellent curability when the composition is used in multi-color molding or the like after storage, it is preferable for the composition to be a two-component type of silicone rubber composition divided into a silicone composition containing at least component A and component D but not containing component B, and a silicone composition containing at least component B but not containing component D. Component C in this case may be contained in either composition.

Because it contains component (ii) and component C, even when cured at a relatively low temperature, the present composition has excellent adhesion to polyethylene resins, polypropylene resins, saturated polyesters such as PET and PBT, polystyrene resins, AS resins, ABS resins, polyamides, polycarbonates, acrylic resins, methacrylic resins, and other such organic resins, and this composition can therefore be utilized as a coating agent or an adhesive agent for these organic resins. Also, when the present composition is used as a silicone rubber composition for composite molding, such as multi-color (such as two-color) molding or insert molding with a silicone rubber composition and an organic resin in injection molding, since adhesion to organic resins is excellent even in molding at a relatively low temperature, and since the mold release properties are excellent, the composite molding of organic resins with low heat resistance can be carried out more efficiently. When the present composition is used as a silicone rubber composition for composite molding, there are no restrictions on the molding conditions, but it is preferable, for example, to heat the material to a temperature below the softening point of the organic resin to be composite molded, such as 80 to 150° C. Nor are there any restrictions on the heating time, but a treatment lasting from a few seconds to a few minutes is favorable.

The silicone rubber composition of the present invention will now be described in detail through examples. The viscosity given in these working examples is the value at 25° C.

Preparation of Silatrane Derivative 12.2 g (0.2 mol) Of 2-hydroxyethylamine, 81.7 g (0.6 mol) of methyltrimethoxysilane, 57.1 g (0.5 mol) of allyl glycidyl ether, and 32 g of methanol were put in a 500 mL four-neck flask equipped with an agitator, a thermometer, and a reflux condenser. This mixture was heated and agitated for 8 hours at the reflux temperature of methanol. The total amount of the reactive mixture obtained was then transferred to a pear-shaped flask, and the low-boiling component was distilled off by rotary evaporation, which yielded 63.3 g of a faintly yellow trasparent liquid. This transparent liquid was subjected to $^{29}$Si-nuclear magnetic resonance analysis and $^{13}$C-nuclear magnetic resonance analysis, which confirmed that the silatrane derivative described by the following formula was produced. This silatrane derivative was contained in a proportion of at least 90 wt %.

(Chemical Formula 9)

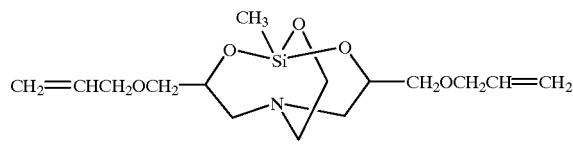

WORKING EXAMPLE 1

100 Weight parts of a polydiorganosiloxane mixture composed of 90 wt % dimethylvinylsiloxy group-capped polydimethylsiloxane capped at both ends of the molecular chain and having a viscosity of 10,000 mPa·s and 10 wt % trimethylsiloxy group-capped dimethylsiloxane.methylhexenylsiloxane copolymer capped at both ends of the molecular chain and having a viscosity of 350 mPa·s and having 5 silicon atom-bonded hexenyl groups per molecule, 30 weight parts of fumed silica with a specific surface area of 200 m$^2$/g, 5 weight parts hexamethyldisilazane (used as a surface treatment agent for the silica), and 2 weight parts water were uniformly mixed, and were then further mixed under a vacuum while being heated for 2 hours at 170° C. After cooling, 1.0 weight part of the silatrane derivative described by formula 9, 3.5 weight parts of a trimethylsiloxy group-capped dimethylsiloxane.methylhydrogensiloxane copolymer capped at both ends of the molecular chain and having a viscosity of 5 mPa·s and having 5 silicon atom-bonded hydrogen atoms per molecule (an amount such that the ratio of the number of moles of silicon atom-bonded hydrogen atoms in this copolymer to the number of moles of silicon atom-bonded alkenyl groups in the above-mentioned polydiorganosiloxane mixture was 3.6:1), 0.06 weight part 3-methyl-1-hexyn-3-ol, and a 1,3-divinyltetramethyldisiloxane solution of a 1,3divinyltetramethyldisiloxane complex of platinum, used in an amount such that there were 7 weight parts of platinum metal atoms per million weight parts of the above-mentioned polydiorganosiloxane mixture, were mixed with 100 weight parts of the base compound obtained above to prepare a silicone rubber composition.

The organic resin test piece described in Table 1 was then placed in a chrome-plated mold, the above-mentioned silicone rubber composition was injected from above, and the material was heated for 10 minutes at 120° C. to cure the composition. The adhesion of the material to organic resins and its mold release properties were observed, the results of which are given in Table 1. To evaluate the adhesion of the silicone rubber to organic resins, the silicone rubber was peeled away from the organic resin, and a "◯" was given if the silicone rubber underwent cohesive failure, whereas an "Δ" was given if the silicone rubber was peeled only on the interface surface where it underwent a partial cohesive failure; and "x" was given if the peeling occurred over the entire interface surface of the silicone rubber. In the evaluation of the mold release properties of the silicone rubber, a "○" was given if the silicone rubber came away from the mold easily, with no cohesive failure, whereas an "x" was given if the silicone rubber underwent cohesive failure and partially adhered to the mold. Also, a polybutylene terephthalate resin test piece was placed in a chrome-plated metal mold, and the above-mentioned silicone rubber composition was injected from above and heated at 110°C. for 10 minutes to cure the composition. The adhesion of this silicone rubber to this resin was observed just as above, the results of which are given in Table 1. Also, this silicone rubber composition was allowed to stand for 3 days at room temperature, and the change in viscosity was checked. These results are given in Table 1.

Comparative Example 1

Other than not adding the silatrane derivative used in Working Example 1, a silicone rubber composition was prepared in the same manner as in Working Example 1. The adhesion of this silicone rubber composition to organic resins and its mold release properties were evaluated in the same manner as in Working Example 1. This silicone rubber composition was allowed to stand for 3 days at room temperature, and the change in viscosity was checked. These results are also given in Table 1.

WORKING EXAMPLE 2

The silatrane derivative prepared in Reference Example 1 in an amount of 1.0 weight part, a trimethylsiloxy group-capped dimethylsiloxane.methylhydridosiloxane copolymer capped at both ends of the molecular chain in an amount of 2.6 weight parts and having five silicon atom-bonded hydrogen atoms per molecule and a viscosity of 5 mPa·s (the amount of this copolymer was such that the ratio of the number of moles of silicon atom-bonded hydrogen atoms in the copolymer to the number of moles of silicon atom-bonded alkenyl groups in the above-mentioned polydiorganosiloxane mixture was 2.7:1), 0.06 weight part 3-methyl-1-hexyn-3-ol, and thermoplastic silicone resin microparticles (the softening point of the silicone resin was 85° C., and the average diameter of the microparticles was 1 μm) containing a 1,3-divinyltetramethyldisiloxane complex of platinum, used in an amount such that there were 7 weight parts of platinum metal atoms per million weight parts of the above-mentioned polydiorganosiloxane mixture, were mixed with 100 weight parts of the base compound prepared in Working Example 1 to prepare a silicone rubber composition. The adhesion of this silicone rubber composition to organic resins and its mold release properties were evaluated in the same manner as in Working Example 1. This silicone rubber composition was allowed to stand for 3 days at room temperature, and the change in viscosity was checked. These results are given in Table 1.

Comparative Example 2

Other than adding vinyltrimethoxysilane instead of the silatrane derivative used in Working Example 1, a silicone rubber composition was prepared in the same manner as in Working Example 1. The adhesion of this silicone rubber composition to organic resins and its mold release properties were evaluated in the same manner as in Working Example 1. This silicone rubber composition was allowed to stand for 3 days at room temperature, and the change in viscosity was checked. These results are all given in Table 1.

Comparative Example 3

100 Weight parts of a dimethylvinylsiloxy group-capped polydimethylsiloxane capped at both ends of the molecular chain and having a viscosity of 10,000 mPa·s, 30 weight parts of fumed silica with a specific surface area of 200 m²/g, 5 weight parts hexamethyldisilazane (used as a surface treatment agent for the silica), and 2 weight parts water were uniformly mixed, and were then further mixed under a vacuum while being heated for 2 hours at 170° C. After cooling, 1.0 weight part of the silatrane derivative described by chemical formula 9, 2.7 weight parts of a trimethylsiloxy group-capped dimethylsiloxane.methylhydrogensiloxane copolymer capped at both ends of the molecular chain and having a viscosity of 5 mPa·s and having 5 silicon atom-bonded hydrogen atoms per molecule (an amount such that the ratio of the number of moles of silicon atom-bonded hydrogen atoms in this copolymer to the number of moles of silicon atom-bonded alkenyl groups in the above-mentioned polydiorganosiloxane mixture would be 4.9:1), 0.06 weight part 3-methyl-1-hexyn-3-ol, and a 1,3-divinyltetramethyldisiloxane solution of a 1,3-divinyltetramethyldisiloxane complex of platinum, used in an amount such that there were 7 weight parts of platinum metal atoms per million weight parts of the above-mentioned polydiorganosiloxane, were mixed with 100 weight parts of the base compound obtained above to prepare a silicone rubber composition. The adhesion of this silicone rubber composition to organic resins and its mold release properties were evaluated in the same manner as in Working Example 1. This silicone rubber composition was allowed to stand for 3 days at room temperature, and the change in viscosity was checked. These results are given in Table 1.

WORKING EXMAPLE 3

A silicone rubber composition was prepared by mixing 100 weight parts of the base compound pressed in Working Example 1, 1.0 weight part of the silatrane derivative described by chemical formula 9.8 weight parts of a dimethylhydrogensiloxy group-capped polydimethylsiloxane capped at both ends of the molecular chain and having a viscosity of 10 mPa·s (an amount such that the ratio of the number of moles of silicon atom-bonded hydrogen atoms in this copolymer to the number of moles of silicon atom-bonded alkenyl groups in the polydiorganosiloxane mixture included in the above-mentioned base compound would be 1.8:1), and 0.06 weight part 3-methyl-1-hexyn-3-ol, and a 1,3-divinyltetramethyldisiloxane solution of a 1,3-divinyltetramethyldisiloxane complex of platinum, used in an amount such that there were 7 weight parts of platinum metal atoms per million weight parts of the above-mentioned polydiorganosiloxane mixture. The adhesion of this silicone rubber composition to organic resins and its mold release properties were evaluated in the same manner as in Working Example 1. This silicone rubber composition was allowed to stand for 3 days at room temperature, and the change in viscosity was checked. These results are given in Table 1.

TABLE 1

| | Working Ex. 1 | Working Ex. 2 | Working Ex. 3 | Comp. Ex. 1 | Comp. Ex. 2 | Comp. Ex. 3 |
|---|---|---|---|---|---|---|
| Adhesion to organic resins (120° C.) | | | | | | |
| Nylon-6 resin | ○ | ○ | ○ | Δ | ○ | ○ |
| Polypropylene resin | ○ | ○ | ○ | Δ | ○ | ○ |
| Polybutylene terephthalate resin | ○ | ○ | ○ | Δ | ○ | ○ |
| Polycarbonate resin | ○ | ○ | ○ | Δ | ○ | ○ |
| Mold release properties | ○ | ○ | ○ | ○ | X | ○ |
| Adhesion to organic resins (110° C.) | | | | | | |
| Polybutylene terephthalate resin | ○ | ○ | ○ | X | X | Δ |
| Change in viscosity of silicone rubber comp. | Cured | no changes | cured | cured | cured | cured |

We claim:

1. A silicone rubber composition comprising
   (A) 100 weight parts of a polydiorganosiloxane mixture comprising (i) 1 to 99 wt % polydiorganosiloxane having at least two silicon atom-bonded vinyl groups per molecule and (ii) the remaining percentage of polydiorganosiloxane having at least two non-vinyl silicon atom-bonded alkenyl groups per molecule;
   (B) a polyorganosiloxane having at least two silicon atom-bonded hydrogen atoms per molecule in an amount such that the ratio of the number of moles of hydrogen atoms bonded to silicon atoms in this component to the number of moles of alkenyl groups bonded to silicon atoms in component (A) is between 0.5:1 and 20:1;
   (C) 0.1 to 10 weight parts of a silatrane derivative described by general formula:

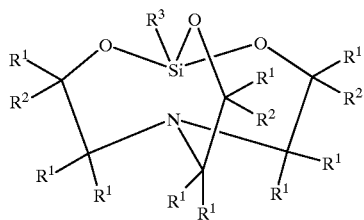

where each R¹ group is independently selected from the group consisting of a hydrogen atom and alkyl groups; each R² group is independently selected from the group consisting of a hydrogen atom, alkyl groups, and alkenyloxyalkyl groups described by general formula

—R⁴—O—R⁵ where R⁴ is an alkylene group, and R⁵ is an alkenyl group; at least one R² group is an alkenyloxyalkyl group; and R³ is a group selected from the group consisting of substituted and unsubstituted monovalent hydrocarbon groups, $C_1$ to $C_{10}$ alkoxy groups, glycidoxyalkyl groups, oxiranylalkyl groups, acyloxyalkyl groups, and aminoalkyl groups; and (D) a platinum type catalyst in an amount sufficient to cure the composition.

2. A silicone rubber composition as defined in claim 1, in which component (ii) is a polydiorganosiloxane having at least two silicon atom-bonded hexenyl groups per molecule.

3. A silicone rubber composition as defined in claim 1, where component (D) comprises thermoplastic resin microparticles containing a platinum type catalyst in an amount of at least 0.01 wt % as platinum metal atoms and the softening point of the thermoplastic resin is 50 to 150° C. and the average diameter of the microparticles is 0.01 to 10 μm.

4. A silicone rubber composition as defined in claim 1, where component A(i) comprises about 50 to 99 wt % of component (A) and is dimethylvinylsiloxy group-capped polydimethylsiloxane capped at both ends of the molecular chain and has a viscosity in a range of 10 to 1,000,000 mPa·s at 25° C.

5. A silicone rubber composition as defined in claim 1, where component (A)(ii) is a dimethylhexenylsiloxy group-capped dimethylsiloxane-methylhexenylsiloxane copolymer capped at both ends of the molecular chain having a viscosity in a range of 10 to 1,000,000 mpa·s at 25° C.

6. A silicone rubber composition as defined in claim 1, where component B is added in an amount such that the number of moles of hydrogen atoms bonded to silicon atoms in Component B to the number of alkenyl groups bonded to silicon atoms in component A is between 0.5:1 to 20:1.

7. A silicone rubber composition as defined in claim 1, where the silitrane derivative is described by formula

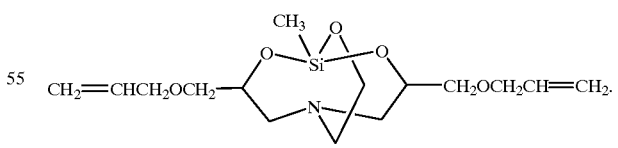

* * * * *